United States Patent
Sakai

(10) Patent No.: US 9,440,696 B2
(45) Date of Patent: Sep. 13, 2016

(54) ADJUSTABABLE BAG HARNESS FOR A BICYCLE

(71) Applicant: Nori Sakai, New York, NY (US)

(72) Inventor: Nori Sakai, New York, NY (US)

(73) Assignee: Portage World-Wide, Inc., New York, NY (US)

( * ) Notice: Subject to any disclaimer, the term of this patent is extended or adjusted under 35 U.S.C. 154(b) by 49 days.

(21) Appl. No.: 14/616,357

(22) Filed: Feb. 6, 2015

(65) Prior Publication Data

US 2015/0225032 A1     Aug. 13, 2015

Related U.S. Application Data

(60) Provisional application No. 61/939,023, filed on Feb. 12, 2014.

(51) Int. Cl.
    *B62J 9/00*        (2006.01)
    *B62J 7/08*        (2006.01)
    *B62J 7/04*        (2006.01)

(52) U.S. Cl.
CPC .. *B62J 7/04* (2013.01); *B62J 7/08* (2013.01); *B62J 9/001* (2013.01); *B62J 9/00* (2013.01)

(58) Field of Classification Search
CPC ............... B62J 7/04; B62J 7/08; B62J 9/00; A45F 2003/142
See application file for complete search history.

(56) References Cited

U.S. PATENT DOCUMENTS

| | | | | |
|---|---|---|---|---|
| 4,262,829 A * | 4/1981 | Hine, Jr. | ................... | B62J 9/00 224/417 |
| 4,387,835 A * | 6/1983 | Golzer | ..................... | B62J 9/00 220/771 |
| 5,673,833 A * | 10/1997 | Ortlieb | ..................... | B62J 9/00 224/419 |
| 5,810,230 A * | 9/1998 | Nutto | ........................ | B62J 9/00 224/417 |
| 5,918,785 A * | 7/1999 | Irose | ......................... | A45F 3/14 224/250 |
| 6,095,473 A * | 8/2000 | Engers | ..................... | B62J 7/08 224/425 |

(Continued)

FOREIGN PATENT DOCUMENTS

DE          29701979 U1 *   4/1997   ............... B62J 9/00

*Primary Examiner* — Justin Larson

(74) *Attorney, Agent, or Firm* — Cozen O'Connor

(57) ABSTRACT

A harness for mounting a non-pannier bag to a pannier mount. The harness has an upper frame member having at least one fastener for releasably attaching the upper frame body member to the mount, a lower frame body member disposed distally from the upper frame body member and configured to releasably engage with a lower frame portion of the mount. A connecting member attached between the upper frame body member and the lower frame body member. Two upper straps, each having a fixed end extending outwardly from one of the upper frame body and the connecting member, at least one of the upper straps being adjustable in length. Each of the two upper straps having a connector at a free end configured to releasably connect with one another to form a first loop. At least one lower strap attached at one end to the lower member, each at least one lower strap being adjustable in length and configured to be connectable to one of the upper frame body member and first loop so as to form a second loop. The first loop and the second loop together forming a receiving area for releasably securing the non-pannier bag to the pannier mount.

17 Claims, 10 Drawing Sheets

(56) References Cited

U.S. PATENT DOCUMENTS

| | | | | |
|---|---|---|---|---|
| 6,702,505 B1 * | 3/2004 | Nutto | ............... | B62J 9/00 24/421 |
| 7,971,763 B2 * | 7/2011 | Chace | ............... | A45F 3/02 224/153 |
| 8,292,139 B2 * | 10/2012 | Golub | ............... | B62J 7/08 224/419 |
| 8,857,685 B2 * | 10/2014 | Vigeant | ............... | B62J 7/08 224/419 |
| 9,072,366 B2 * | 7/2015 | Jensen | ............... | A45F 3/14 |
| 9,340,247 B2 * | 5/2016 | Vigeant | ............... | B62J 7/08 |
| 2003/0147691 A1 * | 8/2003 | Ho | ............... | B62J 7/08 403/322.1 |
| 2011/0006178 A1 * | 1/2011 | Cheng | ............... | B62J 7/08 248/213.2 |
| 2012/0255983 A1 * | 10/2012 | Semone | ............... | A45F 3/04 224/585 |
| 2015/0225032 A1 * | 8/2015 | Sakai | ............... | B62J 7/04 224/430 |

\* cited by examiner

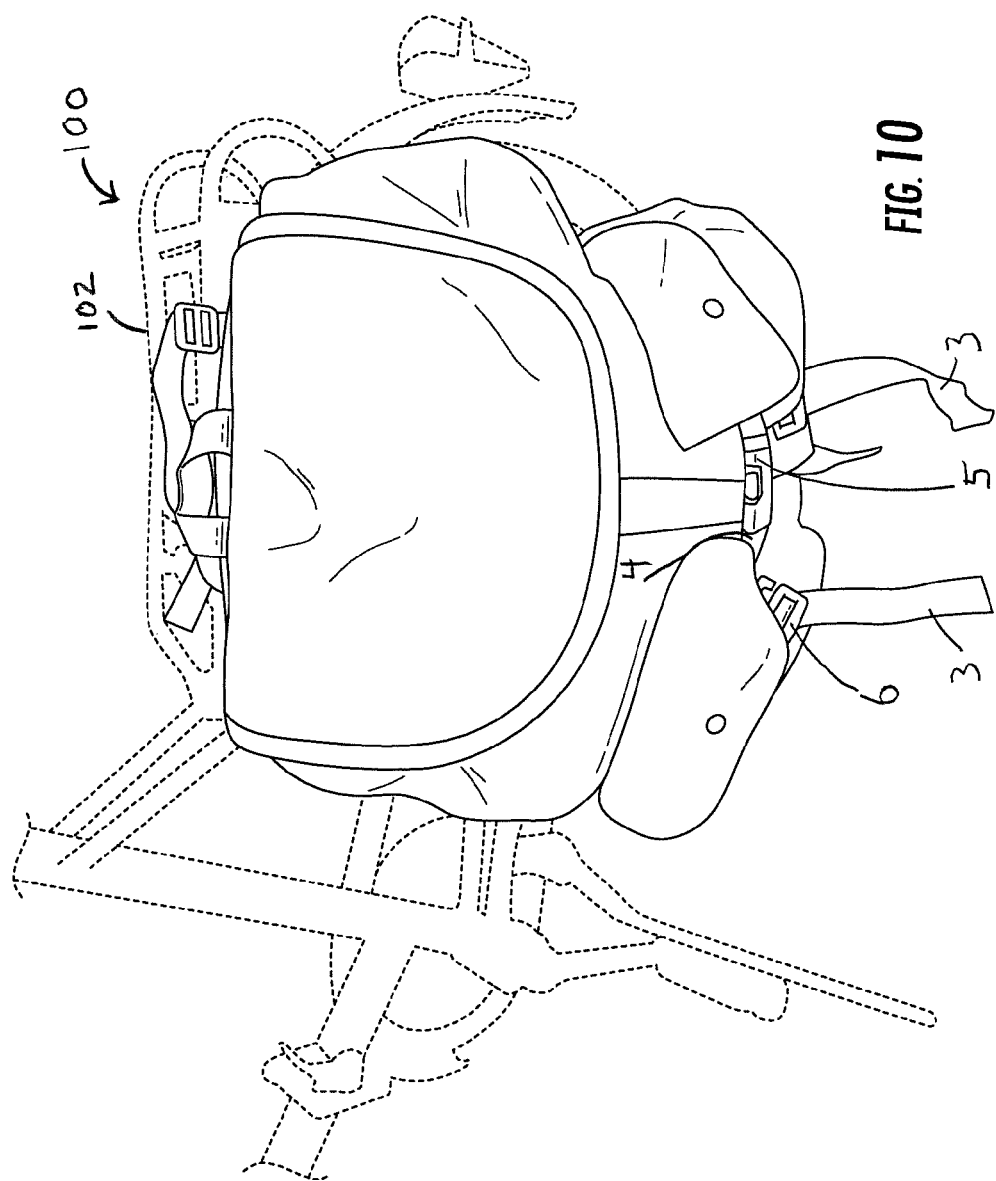

ADJUSTABABLE BAG HARNESS FOR A BICYCLE

CROSS REFERENCE TO RELATED APPLICATIONS

This application claims priority from U.S. provisional patent application No. 61/939,023, filed on Feb. 12, 2014, the entire content of which is incorporated by reference.

BACKGROUND TO THE INVENTION

1. Field of the Invention

The present invention relates to an adjustable harness designed to secure bags of various shapes and sizes to non-enclosed 2-wheel transportation vehicles such as bicycles, scooters, motorcycles, etc. More particularly, the present invention is directed to a harness for mounting a messenger bag to a bicycle pannier rack frame.

2. Discussion of Related Art

FIG. 1 shows a pannier mount 100 installed to a bicycle frame over a rear wheel of a bicycle. The mount is triangular in shape, formed of metal tubing and connected to the bicycle frame such that a support surface 102 is positioned over the rear wheel and secured to the seat stay 104 of the bicycle frame, and a portion of the frame is near the rear wheel hub 106. As shown, the triangle shaped mount has its base positioned over the rear wheel, with two downwardly-extending sides angled towards each other at a triangle apex proximate the rear wheel hub.

Such a mount 100 is designed to secure one or more pannier bags to a bicycle, as shown in FIG. 2. Typically, two pannier bags are connected, one on each side of the mount, to provide substantially equal weight distribution about the rear wheel of the bicycle. Known pannier bags are specifically designed for mounting to the pannier mount 100. As such, the bags—an example of which is shown on FIG. 3 which depicts (A) a front of the bag and (B) a back of the bag—includes mount hardware. The mount hardware comprises an upper clamp mechanism 50 positioned proximate a top of the bag which releasably connects to the metal tubing of the support surface 102. The mount hardware also includes an anchor mechanism 52 spaced downwardly from the upper clamp mechanism. The anchor mechanism is designed to anchor against the sides of the mount near the triangle apex by the rear wheel hub to prevent outward movement of the bag during operation of the bicycle.

A drawback of prior art pannier bags is that the bags must be specifically designed to be attachable to a pannier mount. As such, the bags are constructed with mount hardware, which adds significant cost. The practical implication is that many bicycle riders will only own a single pannier bag, or a matching pair of such bags. Thus, the rider does not have an option of safely attaching a regular (non-pannier) bag to a pannier mount, such as if the rider desires to use a smaller bag or a bag having a different aesthetic style or construction.

SUMMARY OF THE INVENTION

A harness for mounting a non-pannier bag to a pannier mount installed on a vehicle, the pannier mount having an upper support surface oriented substantially parallel to a direction of travel of the vehicle, positioned proximate a wheel of the vehicle and secured to the vehicle, and a lower frame portion connected to the upper support and downwardly-extending therefrom towards a hub of the wheel. The harness comprises an upper frame body member having at least one fastener configured to releasably attach the upper frame body member to the upper support surface of the pannier mount, a lower frame body member disposed distally from the upper frame body member and configured to releasably engage with the lower frame portion of the pannier mount, a connecting member attached between the upper frame body member and the lower frame body member, and two upper straps. Each of the upper straps have a fixed end extending outwardly from one of the upper frame body and the connecting member. At least one of the upper straps being adjustable in length, and each of the two upper straps having a connector at a free end configured to releasably connect with one another to form, upon connection, a first loop. At least one lower strap is provided which is attached at one end to the lower member, each at least one lower strap being adjustable in length and configured so that a free end of each of the at least one lower strap is connectable to one of the upper frame body member and first loop so as to form a second loop. The first loop and the second loop together forming a receiving area for releasably securing the non-pannier bag to the pannier mount.

In one embodiment, the lower frame portion of the pannier mount is triangle shaped with an apex of the triangle proximal to the hub of the wheel, and wherein the lower frame body has an anchor mechanism configured to anchor against inwardly facing sides of the lower frame portion of the pannier mount to prevent outward movement of the non-pannier bag during operation of the vehicle.

In another embodiment, the upper frame body member and the lower frame body member are oriented substantially parallel to one another and the connecting member is oriented substantially perpendicular to each of the upper frame body member and the lower frame body member such that the upper frame body member, the lower frame body member and the connecting member together form an I-shape.

A method is also provided for attaching a non-pannier bag to a vehicle using a harness as described above. The method involves the steps of securing the non-pannier bag to the harness by laying the harness on a flat surface, placing the non-pannier bag over the upper and lower frame body members, securing the two upper straps across the non-pannier bag to form the first loop and adjusting the two upper straps to impart a snug fit, securing the at least one lower strap to the bag and the two upper straps to form the second loop, securing the harness with the bag secured thereto to the pannier mount by attaching the upper frame body to the upper support surface using the fastener, and engaging the lower frame body member with the lower frame portion of the pannier mount.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

FIG. 10 is a side view of the bag secured to a bicycle using the harness according to an embodiment of the present invention.

DETAILED DESCRIPTION OF PRESENTLY PREFERRED EMBODIMENTS

Figure 4:
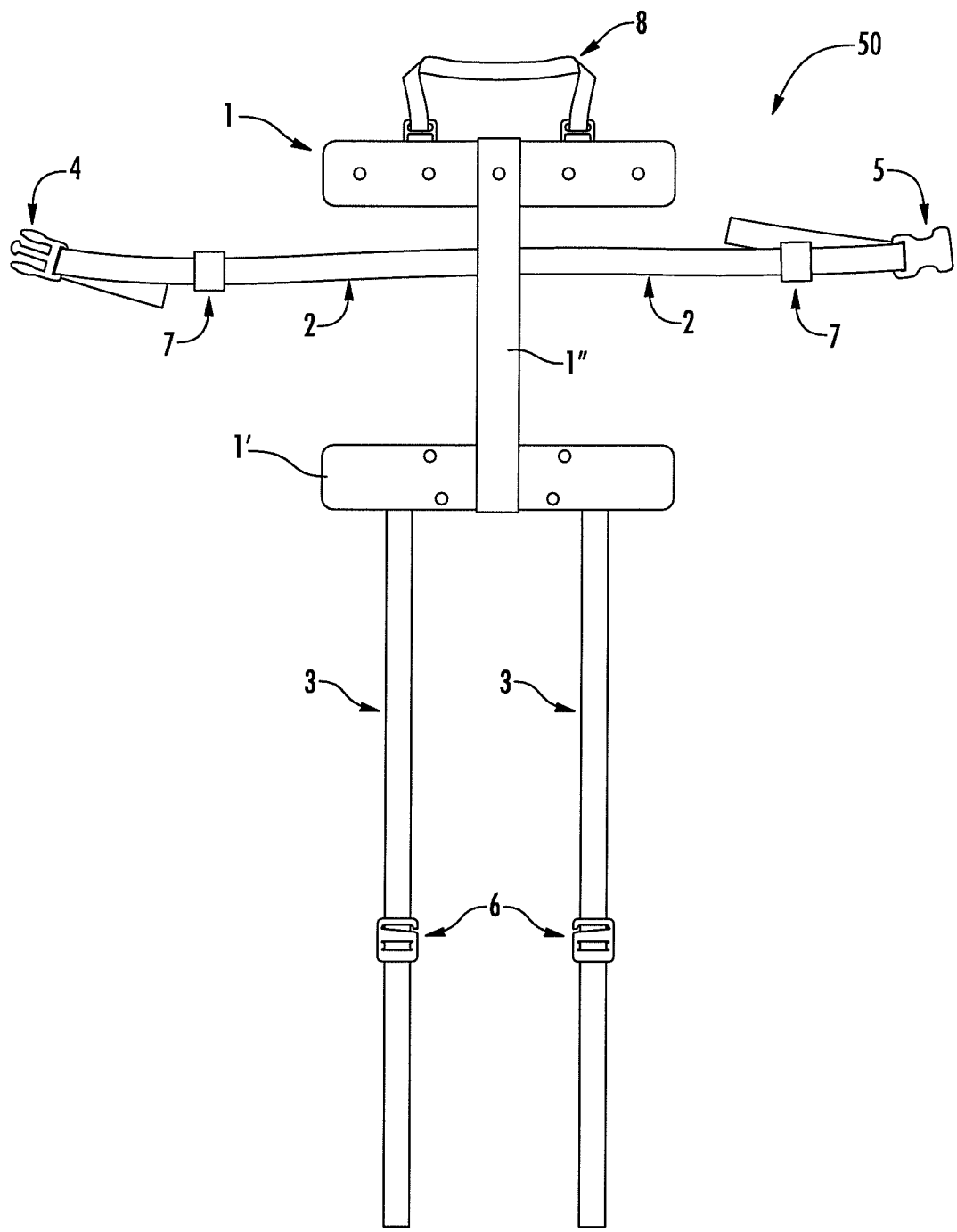
FIG. 4 is a view of a harness for securing a bag to a pannier mount on a bicycle, in accordance with an embodiment of the present invention.

FIG. 4 depicts an embodiment of the invention in which a harness 50 is designed to secure a bag to a pannier mount on a bicycle, such as mount 100. The harness 50 is shown in FIG. 4 in its "open" state and includes an upper frame body member 1, a lower frame body member 1' and a connecting member 1" such that the harness is I-shaped. The upper and lower body members 1, 1' can be made from plastic, reinforced fabric, metal, or any other rigid material having a durable and, preferably, light-weight property. The connecting member 1" joins members 1 and 1'. A pair of upper straps 2 extend outward from connecting member 1" and a pair of lower straps 3 extend downward from lower member 1'. The straps 2, 3 as well as the connecting member 1" can be made from a lightweight, flexible and durable fabric, such as a webbed fabric made of polyester or nylon.

The upper straps 2 are adjustable to different lengths and capable of connecting together at their ends. In the embodiment of FIG. 4, the upper straps connect via a male buckle 4 on the end of one upper strap 2 and a female buckle 5 on the end of the other upper strap 2. In alternate embodiments, the upper straps 2 can connect by way of a snap, tie, clasp, hook/loop fastener or any other mechanism to securely connect the two straps to each other. In the embodiment of FIG. 4, the lower straps 3 are each weaved through a strap clasp 6 so that the strap clasps 6 can be positioned up or down by sliding for length adjustability. In other embodiments, snaps, hook/loop fastener patches, ties, buckles, or other affixing mechanisms can be used instead of the strap clasps 6 and strap loops 7. In further embodiments, there are varying numbers of straps connected to the body at different locations. In a preferred embodiment, a top strap in the configuration of a loop is provided to facilitate carrying of the harness.

Figure 5:
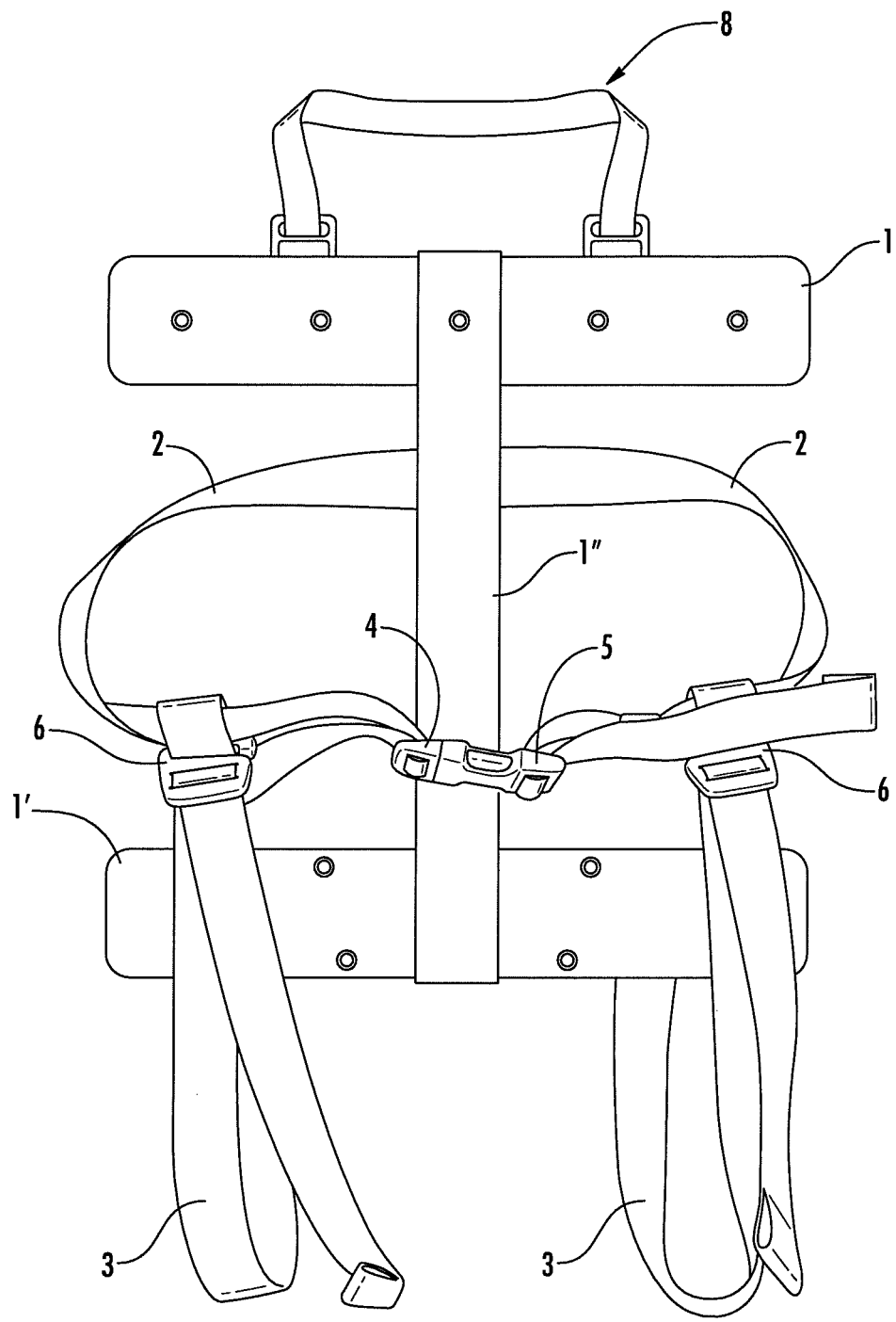
FIG. 5 is a view of the harness shown in FIG. 4 in a closed position, in accordance with an embodiment of the present invention.

FIG. 5 depicts the harness 50 in a "closed" position, i.e., with the straps connected to each other in their intended manner. As shown, male buckle 4 and female buckle 5 of the upper straps are connected to each other to form a loop and the free ends of the bottom straps 3 extend through the loop of the upper straps and are fed through the respective clasps 6 to define a receiving area for a bag.

Figure 6:
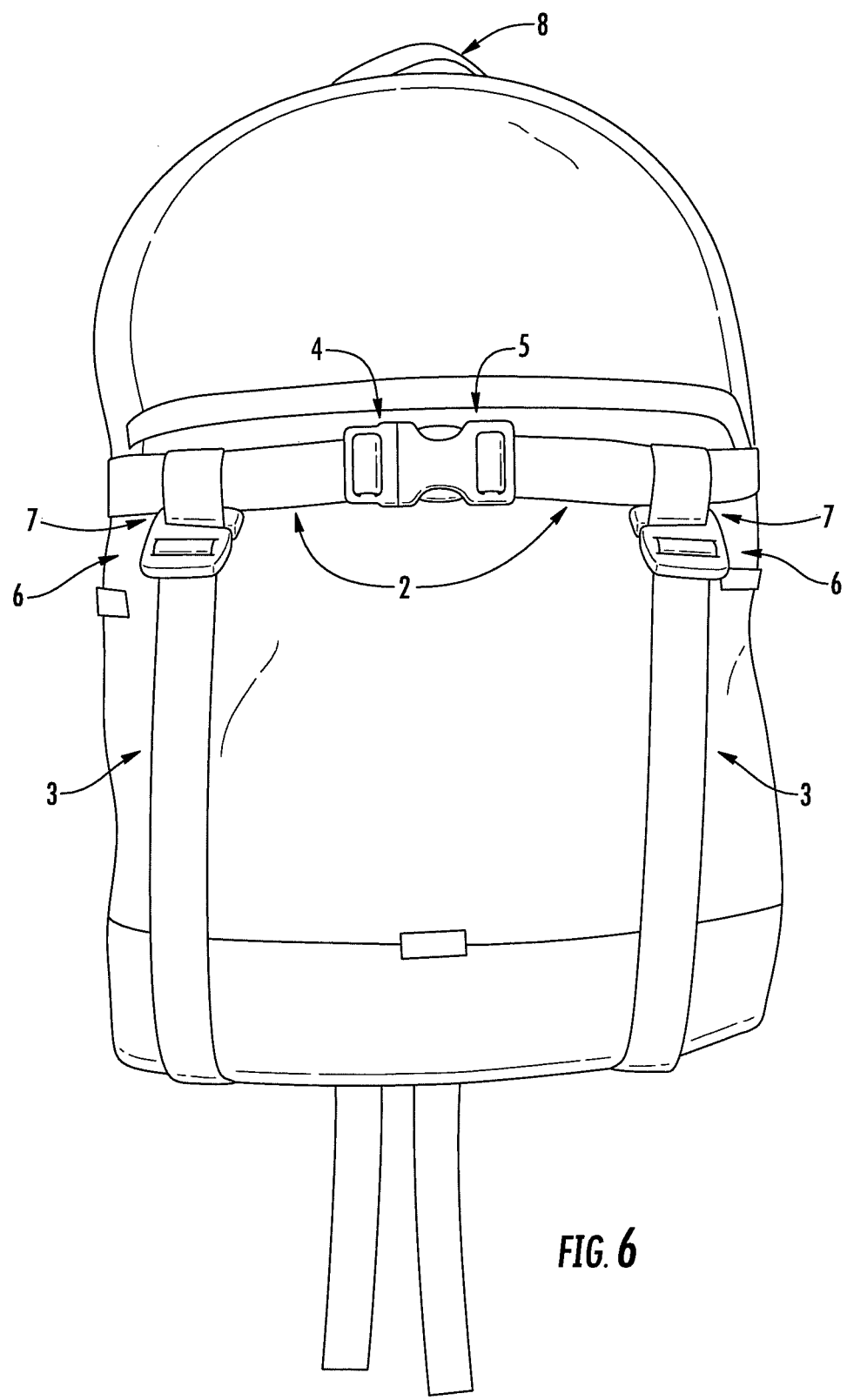
FIG. 6 is a front view of the harness according to an embodiment of the present invention with a bag secured to the harness.

FIG. 6 depicts the front view of the harness with a bag secured in the receiving area. The upper straps 2 are connected via the male buckle 4 and female buckle 5, and adjusted to form a securing belt around a horizontal axis of the bag. The lower straps 3 extend from the lower member 1', across the bottom of the bag, through the loop formed by straps 2, and are secured to adjustable buckles 6 to secure the bag about two horizontal axes (one for each lower strap 3). In this manner, the bag is secured to the harness 50. It should be appreciated, that because of the adjustability of the straps, various bags of different shapes and sizes can be readily secured to the harness 50.

Figure 7:
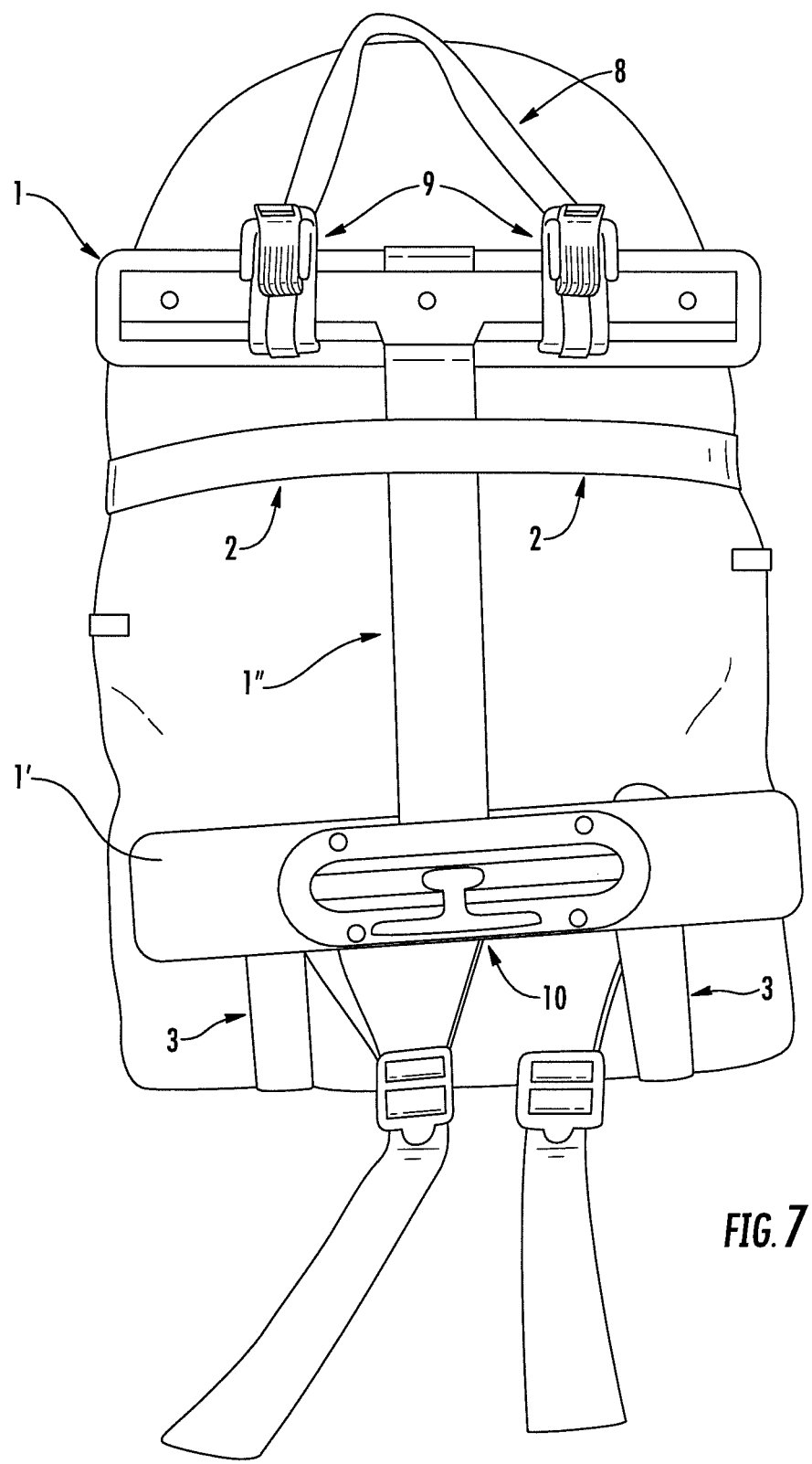
FIG. 7 is a rear view of the harness according to an embodiment of the present invention with a bag secured to the harness.
Figure 8:
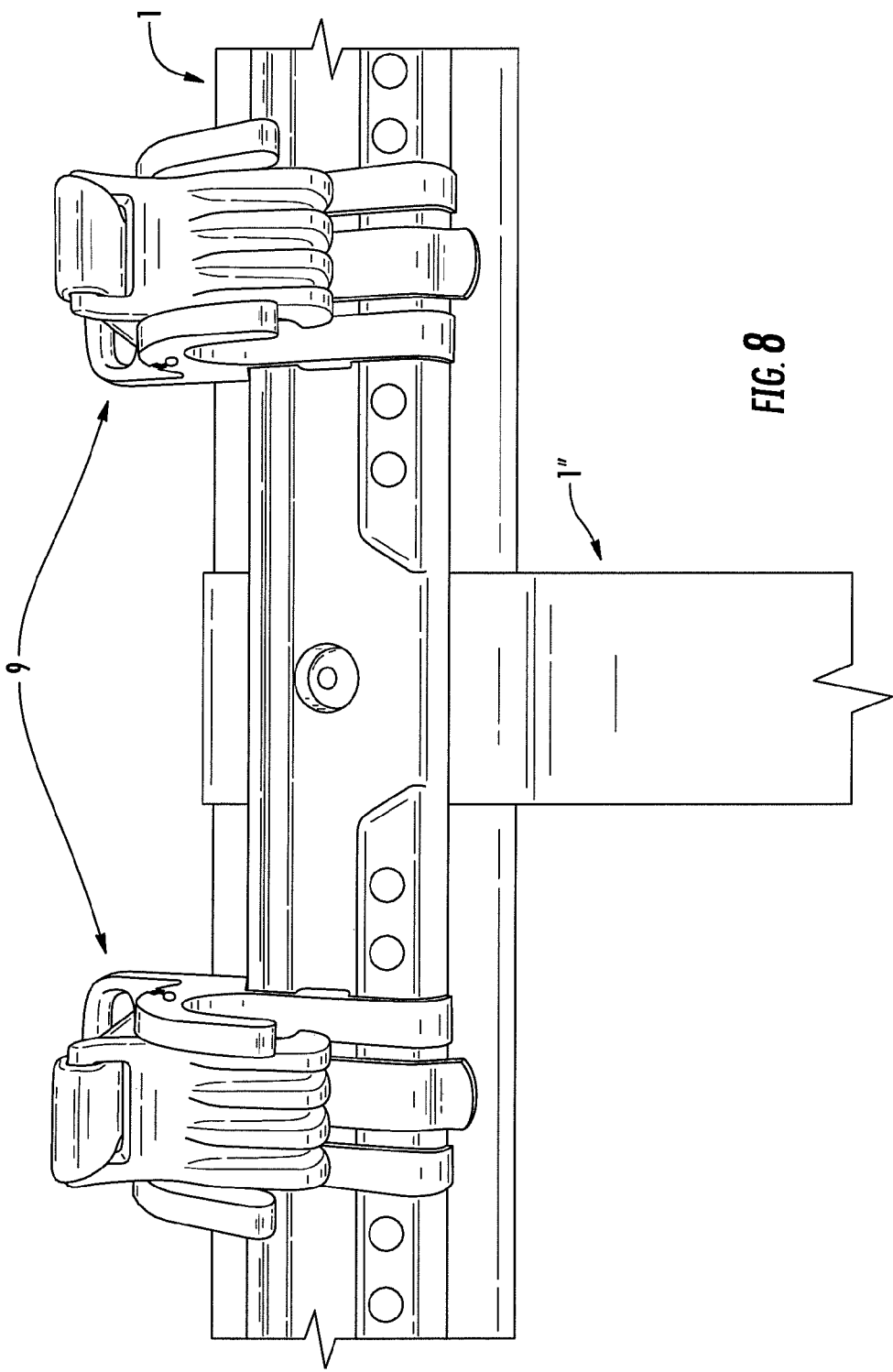
FIG. 8 is a view of a clasp of an upper body member of the harness according to an embodiment of the present invention.
Figure 9:
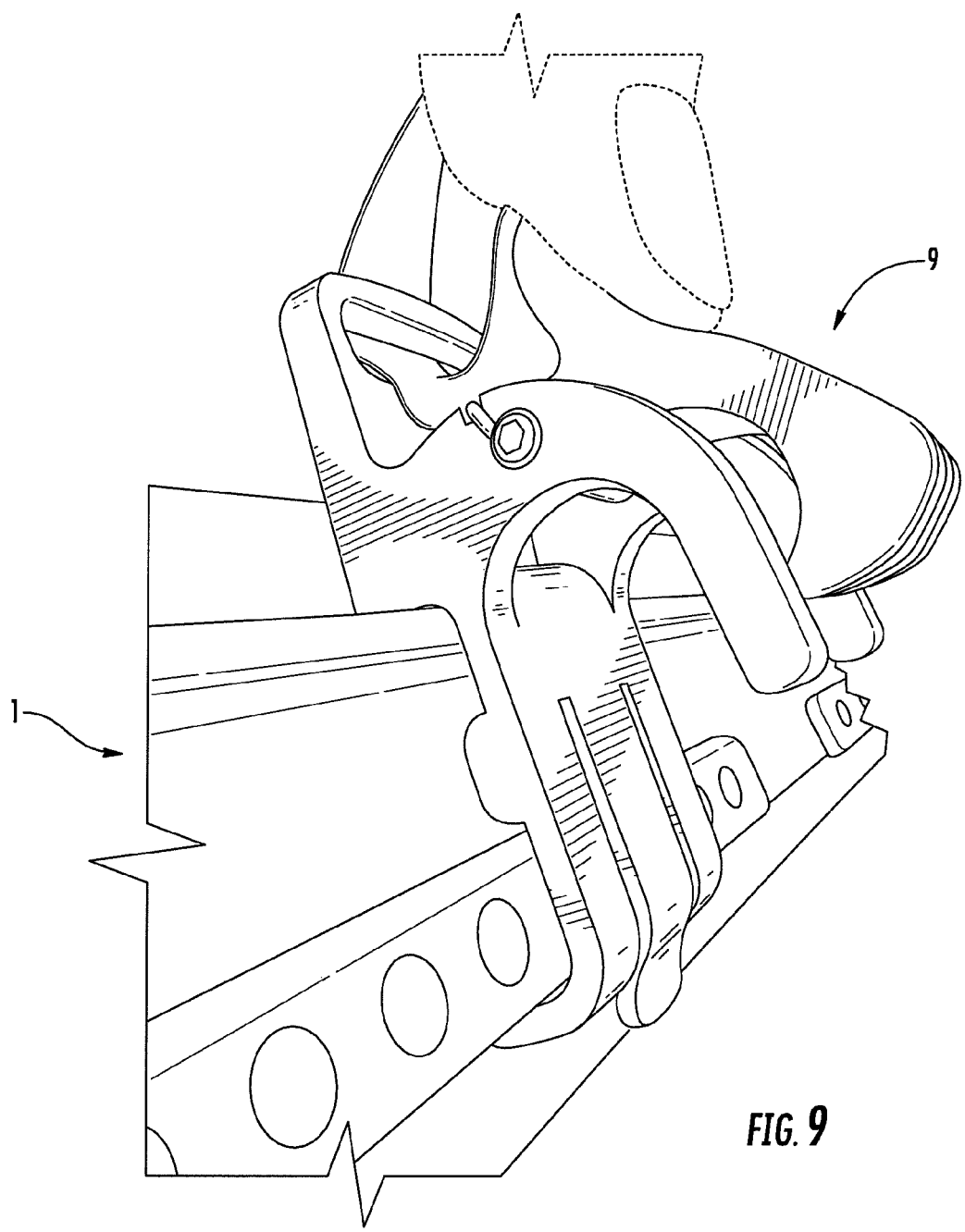
FIG. 9 is a view of the clasp shown in FIG. 8 in the open position.

FIG. 7 depicts a rear view of the harness with a bag mounted therein as shown in FIG. 6. The upper straps 2 protrude from the sides of the upper member 1 and the lower straps 3 protrude from the bottom of the lower member 1'. The upper member 1 is preferably formed of molded plastic having a track opened at one or both ends of the upper member for slidably receiving a pair of clasps 9 therein as shown in FIG. 8. Each clasp 9 receives an end of the carrying strap 8 and also includes a pivoting jaw activated by a thumb press to open the jaw when pressure is applied, and to close the jaw when pressure is released (see FIG. 9). These clasps allow the harness 50 to be attached to, and released from, the support surface of a pannier frame.

Figure 1:
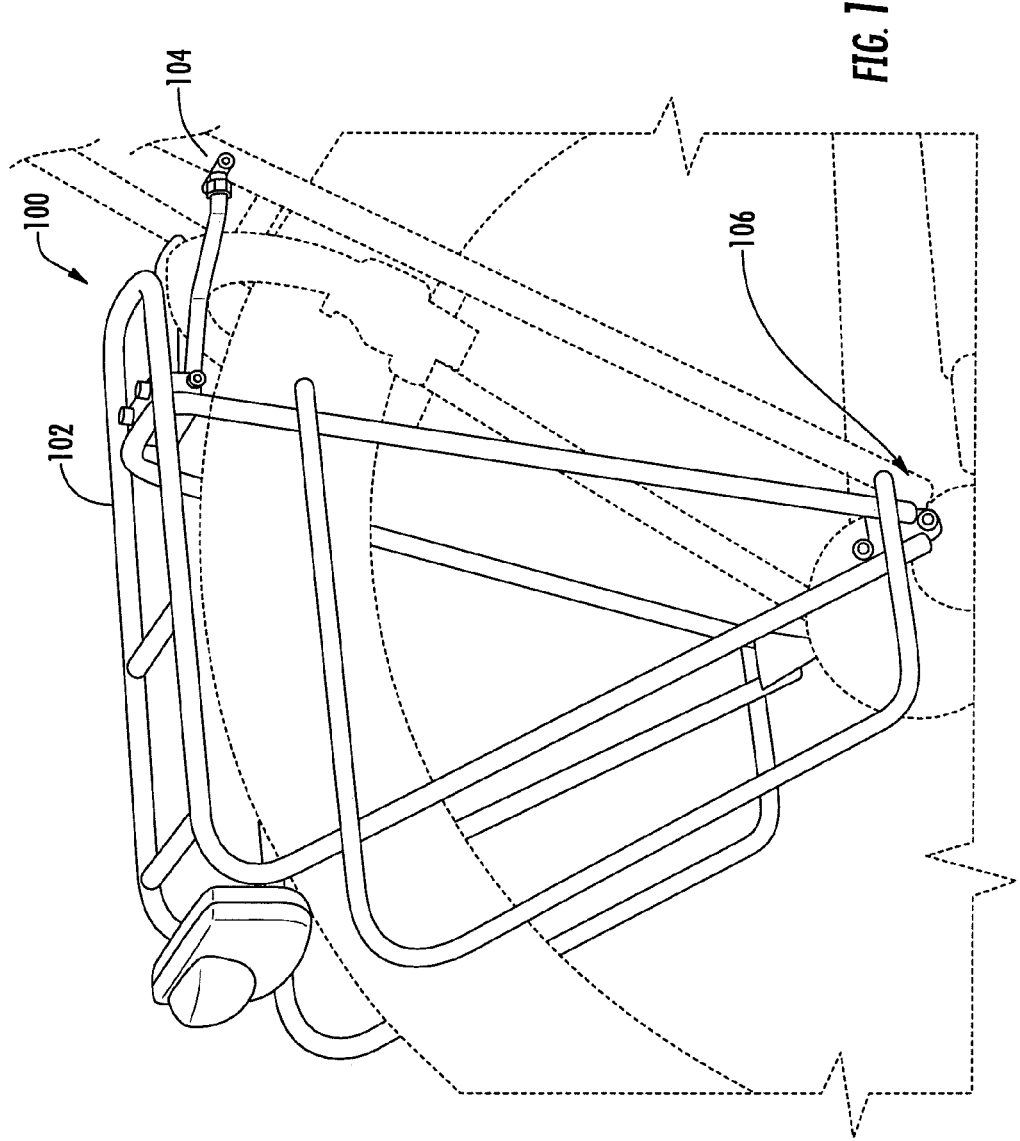
FIG. 1 shows a pannier mount installed in a bicycle frame.
Figure 2:
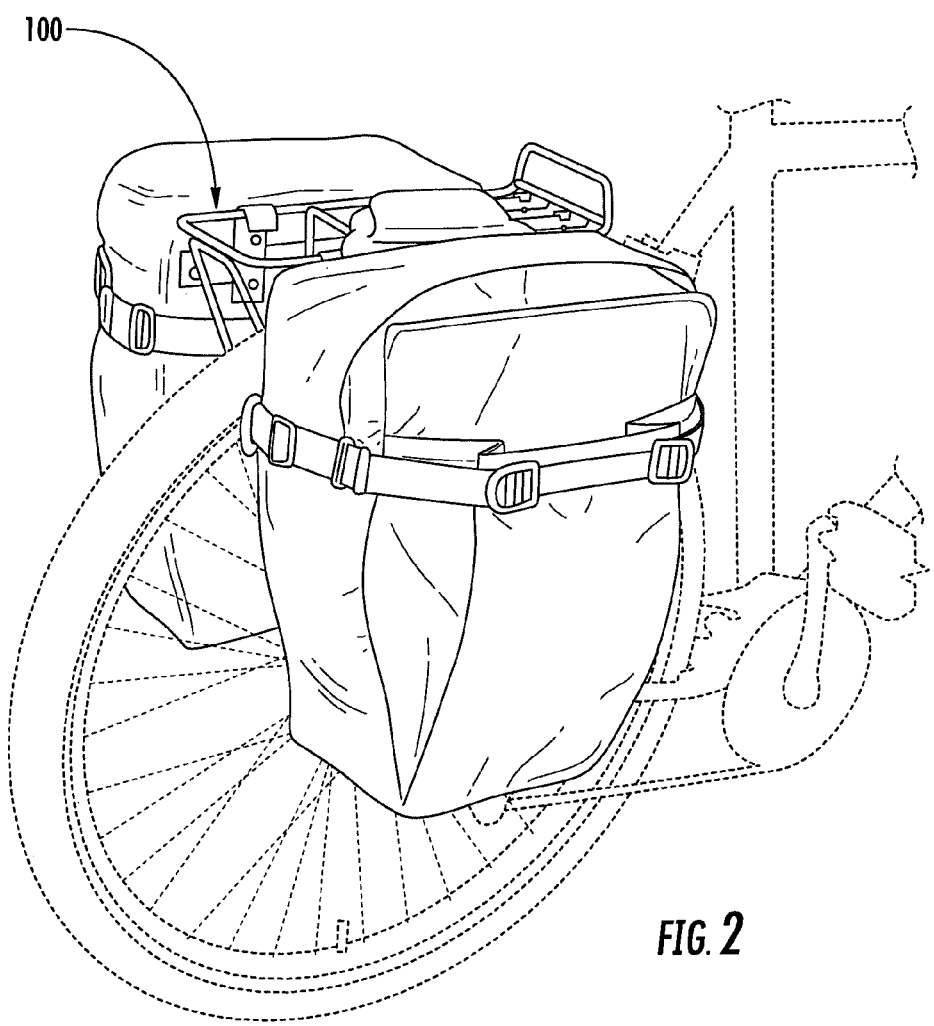
FIG. 2 shows pannier bags mounted to a bicycle.
Figure 3:
FIG. 3 shows a conventional pannier bag.

A lower clasp or anchor 10 is provided on the lower member 1'. The anchor 10 is configured to engage a lower region of the pannier frame, such as near the apex of the triangular frame positioned proximate the rear wheel hub as shown in FIG. 1. The clasps 9, and anchor 10 can be made of molded plastic, metal, or any other lightweight, sturdy material. Preferably, such material should be weatherproof because it is intended that the harness 50 will be for outdoor use. The clasps 9, and anchor 10 can be attached to the harness in any number of ways such as by bolt, adhesive, screw, or any other mechanism capable of securely affixing two objects. In the depicted embodiment, the clasps 9 are slidably engaged with tracks in the upper member 1 to provide a secure, yet adjustable connection, namely, to vary the relative position of the clasps within the track, but the anchor 10 is permanently affixed to the lower member 1'. In further embodiments, there is a varying number of upper and lower clasps. In still further embodiments, the upper clasps 9, and anchor 10 are substituted with other mechanisms for attachment including buckles, hook/loop fasteners, ties, or any other mechanism capable of securely attaching the harness to another object.

In use, a user can attach a carrying bag, such as a backpack, messenger bag, tote bag, etc., to the harness 50 by laying the harness on a flat surface in a position shown in FIG. 4. Thereafter, the bag is placed over the upper and lower members and the upper strap is secured across the bag and adjusted to impart a snug fit. Then, the lower straps are manipulated and secured as shown in FIG. 6. Once the bag is secured to the harness, the assembly, namely, the harness with the bag fitted therein, can be carried such as by the strap 8 and attached to a pannier mount. This is accomplished by opening the thumb clamps 9 and placing them over a portion of the support surface of the pannier mount and then releasing the clamps. Once supported in this manner, the anchor 10 can be engaged with the narrow portion of the pannier mount so that the bag is connected as shown in FIG. 10.

Once the harness with bag is attached to the pannier mount as described above, the bicycle can be operated to transport the bag to a desired destination. Thereafter, the harness (along with the bag securely received by the straps)

can be easily disengaged from the pannier mount by operating the clamps 9 and disengaging the anchor 10.

It should be appreciated that the harness described above allows for the mounting of many types of bags to a pannier mount of a bicycle. In this manner, various bags can be carried by pannier mounts, without being limited only to specific pannier bags.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A harness for mounting a non-pannier bag to a pannier mount installed on a vehicle, the pannier mount having an upper support surface oriented substantially parallel to a direction of travel of the vehicle, positioned by a wheel of the vehicle and secured to the vehicle, and a lower frame portion connected to the upper support and downwardly-extending therefrom towards a hub of the wheel, the harness comprising:

an upper frame body member having at least one fastener configured to releasably attach the upper frame body member to the upper support surface of the pannier mount;

a lower frame body member disposed distally from the upper frame body member and configured to releasably engage with the lower frame portion of the pannier mount;

a connecting member attached between the upper frame body member and the lower frame body member;

two upper straps, each having a fixed end extending outwardly from one of the upper frame body and the connecting member, at least one of said upper straps being adjustable in length, each of the two upper straps having a connector at a free end configured to releasably connect with one another to form, upon connection, a first loop; and at least one lower strap attached at one end to the lower member, each at least one lower strap being adjustable in length and configured so that a free end of each of the at least one lower strap is connectable to one of the upper frame body member and first loop so as to form a second loop, the first loop and the second loop together forming a receiving area for releasably securing the non-pannier bag to the pannier mount.

2. The harness according to claim 1, wherein the at least one fastener of the upper frame body has a clasp mechanism having a pivoting jaw that releasably connects to the upper support surface of the pannier mount.

3. The harness according to claim 1, wherein the lower frame portion of the pannier mount is triangle shaped with an apex of the triangle proximal to the hub of the wheel, and wherein the lower frame body has an anchor mechanism configured to anchor against inwardly facing sides of the lower frame portion of the pannier mount to prevent outward movement of the non-pannier bag during operation of the vehicle.

4. The harness according to claim 1, wherein in the at least one lower strap comprises two lower straps.

5. The harness according to claim 1, wherein the upper frame body member and the lower frame body member are oriented substantially parallel to one another and the connecting member is oriented substantially perpendicular to each of the upper frame body member and the lower frame body member such that the upper frame body member, the lower frame body member and the connecting member together form an I-shape.

6. The harness according to claim 1, wherein the at least one lower strap has a lower strap connector arranged along its length, the lower strap connector being configured to engage with a free end of the at least one lower strap, wherein the at least one lower strap connector is configured to cooperate with the free end of the at least one lower strap so that the free end of each of the at least one lower strap is weaveable through the first loop and back to engage with the lower strap connector to form the second loop.

7. The harness according to claim 1, further comprising a strap clasp configured to engage with the at least one lower strap, wherein the at least one lower strap is weaveable through the strap clasp to slideably adjust the length of the at least one lower strap, the at least one lower strap cooperating with the strap clasp so that a free end of each of the at least one lower strap is weaveable through the first loop and back through the strap clasp to form the second loop.

8. The harness according to claim 1, wherein the two upper straps each extend outwardly from the connecting member.

9. The harness according to claim 1, wherein the two upper straps each extend outwardly from the upper frame body member.

10. The harness according to claim 1, wherein the connectors at the free ends of the two upper straps are from the group consisting snap-fit connectors, tie connectors, clasp connectors and hook/loop fasteners.

11. The harness according to claim 1, wherein the connectors at the free ends of the two upper straps cooperate to facilitate the adjustability in length of the at least one of the two upper straps that is adjustable in length.

12. The harness according to claim 1, wherein the vehicle is a two-wheeled vehicle and the harness is configured to secure the non-pannier bag over the rear wheel of the two-wheel vehicle.

13. The harness according to claim 1, the harness further comprising a top strap, attached to the upper frame body member, to facilitate carrying of the harness.

14. The harness according to claim 13, wherein the top strap is connected to the clasp mechanism.

15. The harness according to claim 10, wherein the connectors at the free ends of the two upper straps are snap-fit connectors, the snap-fit connectors having a male buckle and a female buckle connectable to one another to form the first loop.

16. The harness according to claim 2, wherein the upper frame body member is formed of molded plastic and has a track opened at one or both ends of the upper frame body member for slideably receiving the clasp mechanism.

17. A method of attaching a non-pannier bag to a vehicle using the harness according to claim 2, the method comprising:
  securing the non-pannier bag to the harness by:
    laying the harness on a flat surface,
    placing the non-pannier bag over the upper and lower frame body members,
    securing the two upper straps across the non-pannier bag to form the first loop and adjusting the two upper straps to impart a snug fit, and
    securing the at least one lower strap to the bag and the two upper straps to form the second loop; and
  securing the harness with the bag secured thereto to the pannier mount by:
    attaching the upper frame body to the upper support surface using the fastener, and
    engaging the lower frame body member with the lower frame portion of the pannier mount.

\* \* \* \* \*